T. TOWNEND.
ATTACHMENT TO WHEELS.
APPLICATION FILED JUNE 25, 1912.

1,062,618.

Patented May 27, 1913.

2 SHEETS—SHEET 1.

WITNESSES

INVENTOR
T. Townend

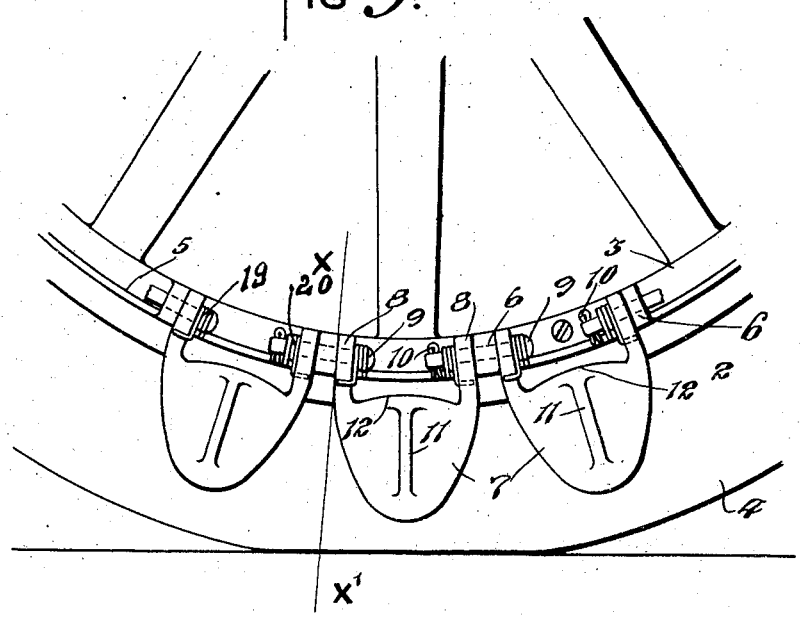
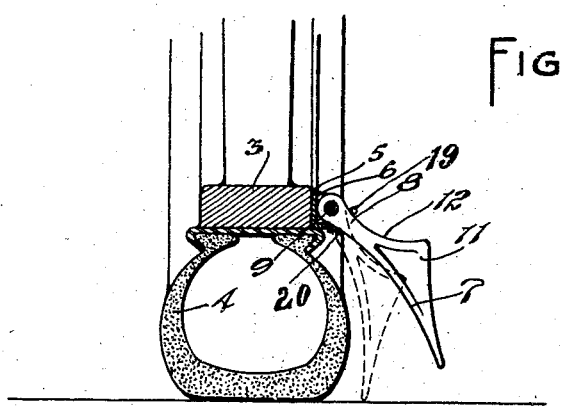

UNITED STATES PATENT OFFICE.

THOMAS TOWNEND, OF WINNIPEG, MANITOBA, CANADA.

ATTACHMENT TO WHEELS.

1,062,618.  Specification of Letters Patent. Patented May 27, 1913.

Application filed June 25, 1912. Serial No. 705,768.

*To all whom it may concern:*

Be it known that I, THOMAS TOWNEND, of the city of Winnipeg, in the Province of Manitoba, Canada, have invented certain new and useful Improvements in Attachments to Wheels, of which the following is the specification.

The invention relates to an attachment to wheels, particularly automobile wheels and the object of the invention is to provide an inexpensive and durable device which can be quickly applied to a wheel and which will effectually prevent the wheel from skidding or sliding sidewise.

It consists essentially in a plurality of spring controlled pivoted dogs or claws attached to the wheel rim and means arranged to engage with the dogs and depress those adjoining the road surface toward the ground, the parts being arranged and constructed as hereinafter more particularly described.

Figure 1:
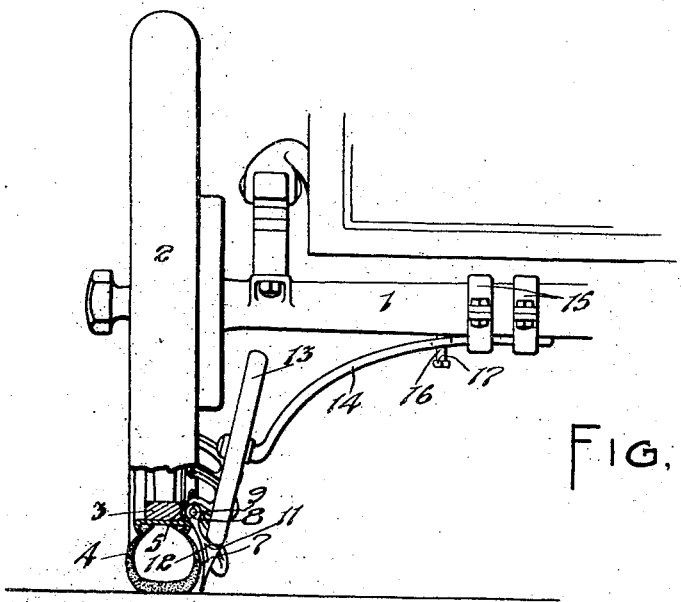
Figure 2:
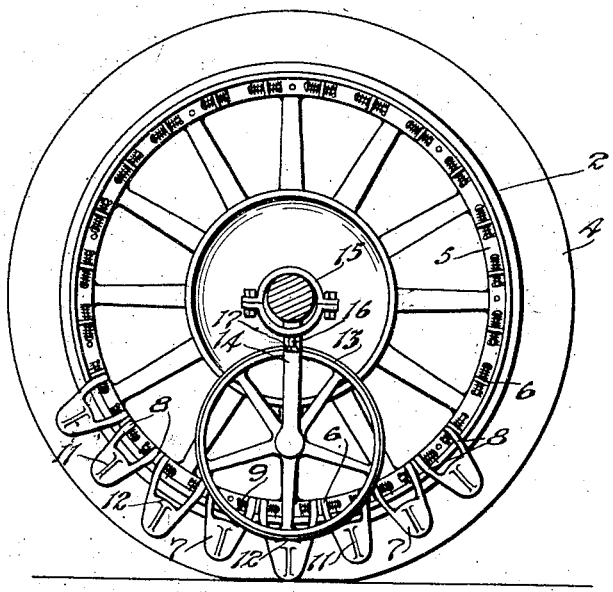

Figure 1 is a front view of a portion of an automobile with my device attached to the wheel thereof, parts being shown in vertical section. Fig. 2 is a side elevation of the wheel with my device attached. Fig. 3 is an enlarged detailed side view of a portion of the wheel showing several of the dogs. Fig. 4 is a vertical sectional view through the wheel, the section being taken in the plane denoted by the line X—X' Fig. 3.

In the drawings like characters of reference indicate corresponding parts in each figure.

1 represents the axle of an automobile on which is mounted the usual wheel 2 supplied with the rim 3 and inflated tire 4.

5 represents a bar of angle-iron cross section secured to the inner side of the rim 3 and fitted at suitable intervals with extending lugs 6.

7 represents dogs or claws having arms 8 extending therefrom which arms are pivotally fastened to the lugs by pivot pins 9 the pins being held by cotter pins 10. The claws have reinforcing ribs 11 formed on the backs thereof which ribs are formed so that they provide a runway at 12 for a wheel 13 which wheel is pivotally mounted on the end of a spring member 14 suitably connected to the axle by clamps 15. A pin 16 passes through the spring member into the axle, which pin is formed with an enlarged head 17 arranged to prevent the spring member from passing too far down. The dogs are held normally in the position shown in full outline in Fig. 4 by the action of oppositely wound springs 19 and 20 disposed on the pins 9 and having their ends bearing on the bar 5 and the arms 8. The wheel 13 is arranged in respect to the wheel 2 and the ground in such a manner that it will press these dogs which are on the lower side of the rim downwardly so that their lower tips are brought to the ground level as the wheel 2 rotates. This position of the said dogs is shown in Figs. 1 and 2 and in dotted outline in Fig. 4. As soon as the wheel 2 turns the dogs are depressed by the wheel 13 and are forced upwardly to the normal position by the action of the springs. In event of a car provided with my device skidding or slipping sidewise the depressed dogs will stick into the ground and in the initial skidding movement will cause the dogs to swing toward the tire. Accordingly the skidding will be immediately stopped. In event of the dogs engaging with an obstruction they will rise and in rising will lift the wheel 13, this motion being provided for by the spring member 14.

What I claim as my invention is:—

1. The combination with a rotatably mounted automobile wheel provided with the usual rim and a pneumatic tire, and the axle supporting the wheel, of a bar secured to the inner side of the rim of the wheel, said bar being provided with pairs of extending lugs, similar dogs having extending arms pivotally secured to the lugs, said dogs being provided on their inner sides with reinforcing ribs forming a run-way, springs holding the dogs normally in a position within the circumference of the tire and an adjustable wheel carried by the axle and designed to ride on the run-way formed by the backs of the ribs such wheel being provided to depress the dogs on the under side of the automobile wheel into a position beyond the circumference of the tire as the wheel rotates, as and for the purpose specified.

2. The combination with a rotatably mounted automobile wheel provided with the usual rim and a pneumatic tire, of a plurality of dogs pivotally secured to the rim of the wheel, said dogs having a substantially horizontal portion, means for normally holding said dogs off the ground, an adjustable wheel carried by the axle and designed to ride said horizontal portions to force said dogs outwardly radially as the wheel rotates.

Signed at Winnipeg this 30th day of March 1912.

THOMAS TOWNEND.

In the presence of—
G. S. ROXBURGH,
L. GOULD.